United States Patent [19]

Kattner et al.

[11] 4,095,238

[45] June 13, 1978

[54] PIEZOELECTRIC DRIVE ELEMENT FOR THE PRINTER HEADS USED IN INK-OPERATED MOSAIC PRINTER UNITS

[75] Inventors: Erich Kattner, Munich; Max Guntersdorfer, Zorneding; Joachim Heinzl, Munich, all of Germany

[73] Assignee: Siemens Aktiengesellschaft, Berlin & Munich, Germany

[21] Appl. No.: 724,114

[22] Filed: Sep. 17, 1976

[30] Foreign Application Priority Data

Sep. 29, 1975 Germany ............................ 2543420

[51] Int. Cl.[2] .......................... G01D 15/16; B41J 3/04

[52] U.S. Cl. ................................................ 346/140 R

[58] Field of Search .............................. 346/140 R, 75

[56] References Cited

U.S. PATENT DOCUMENTS

| | | | |
|---|---|---|---|
| 3,131,320 | 4/1964 | Shinada | 310/9.7 X |
| 3,281,860 | 10/1966 | Adams | 346/75 |
| 3,683,212 | 8/1972 | Zoltan | 346/140 X |
| 3,832,579 | 8/1974 | Arndt | 346/140 X |

*Primary Examiner*—Joseph W. Hartary
*Attorney, Agent, or Firm*—Hill, Gross, Simpson, Van Santen, Steadman, Chiara & Simpson

[57] ABSTRACT

The invention relates to a piezoelectric drive element for cast printer heads used in ink-operated mosaic printer units in which printing liquid is ejected droplet fashion by a mechanism of piezoelectric contraction of the cylindrical drive elements which surround the ink passages, said drive element comprising a plurality of drive electrodes in furtherance of the proposed operation in accordance with the teachings of this invention.

2 Claims, 4 Drawing Figures

PIEZOELECTRIC DRIVE ELEMENT FOR THE PRINTER HEADS USED IN INK-OPERATED MOSAIC PRINTER UNITS

BACKGROUND OF THE INVENTION

1. Field of the Invention

The present invention relates to a piezoelectric drive element equipped with drive electrodes, for cast printer heads used in ink-operated mosaic printer units, in which printing liquid is ejected droplet fashion by a mechanism of piezoelectric contraction of the cylindrical drive elements which surround the ink passages.

2. Prior Art

Piezoelectric drive elements for printing jets have been known for a considerable time now. An U.S. Pat. No. 3,298,030 discloses an ink-jet printer unit using as printing jet a small glass tube which is filled with printing liquid and is surrounded by a cylindrical, piezoelectric drive element. The drive element consists of a piezoceramic tube whose peripheral surfaces have been coated with metal by a vapor-deposition process and which is driven through said peripheral surfaces which function as electrodes. With application of an electrical pulse to the electrodes, the piezoelement and the internal glass tube tract with the consequence that an ink droplet is ejected from the tube.

If piezoelectric drive elements of this kind are combined in accordance with one proposal to form a mosaic printer head in which the individual drive elements are cast in situ in the head, special design problems are encountered in the drive elements as a consequence of the casting operation and of the small dimensions of the head, in particular problems of contacting each individual drive element and problems associated with its security against short-circuiting.

In mosaic printer heads of this kind, the drive elements comprise ink passages arranged in the printer head, the drive elements being in direct contact with the printing liquid. This means that the drive elements are exposed to the risk that ink will penetrate into the porous ceramic resulting in short-circuits thereat. Also, the thin electrodes applied to the drive elements, are extremely difficult to contact.

SUMMARY OF THE INVENTION

The object of the invention is to provide piezoelectric drive elements for the printer heads of ink-operated mosaic printer units, which can be cast in situ in the printer head in a simple fashion, are easy to drive and are reliable in operation.

In accordance with the invention this object is achieved in that at least those parts of the drive elements which are wetted by the printing liquid, are covered by an electrically conductive, ink-impermeable protective layer which in a particular embodiment consists of a metal tube projecting at both ends out of the drive elements.

The drive elements in accordance with the invention have the advantage that they can be cast in situ in synthetic resin for example, making them proof against short-circuiting. For example, the metal tube is situated in position in the drive element which is to be case in situ, prior to the casting operation, and then slipped together with the drive element onto a pin belonging to the mould tool and placed in the mould.

Because the metal tube is conductively connected to the internal electrode, this achieves the major advantage that the drive element can be driven in a very simple fashion. If the pulses which lead to the ejection of an ink droplet, are applied to the external electrode of the drive element whilst the internal electrode is permanently ground through the conductive ink, then there is no need for electrical insulation between the internal electrode and the conductive ink and no capacitances of the kind which could adversely influence the drive function, can be formed between the internal electrode and the ink. Also, this method of effecting the drive reduces the number of connections and therefore the weight of the overall printer head.

In a particularly advantageous embodiment of the invention, the protective layer is attached directly and permanently to the piezoelectric material of the drive element and consists of a stoved silver finish with glass solder. The protective layer constructed in this fashion simultaneously performs the function of the electrodes. This is a major advantage in particular where the manufacture of the drive element is concerned. For example, the drive element can be manufactured in a simple way by arranging it such that, in accordance with the invention, its surface is first of all completely covered with a protective layer and the thus covered drive element then ground off at the edges in such a way that two electrode surfaces which are electrically insulated from one another, are created.

A further advantageous embodiment of the invention comprises a protective layer consisting of the casting material surrounding the drive element in which a metal spiral initially abutting elastically against the internal electrode of the drive element is cast in situ. With a protective layer built up in this manner, the operating voltage of the piezoceramic can be reduced, because the deformation work involved by this soft protective layer is very small. Also, easy contacting of the drive element can be effected through the metal spiral.

DESCRIPTION OF THE PREFERRED EMBODIMENTS

Figure 1:
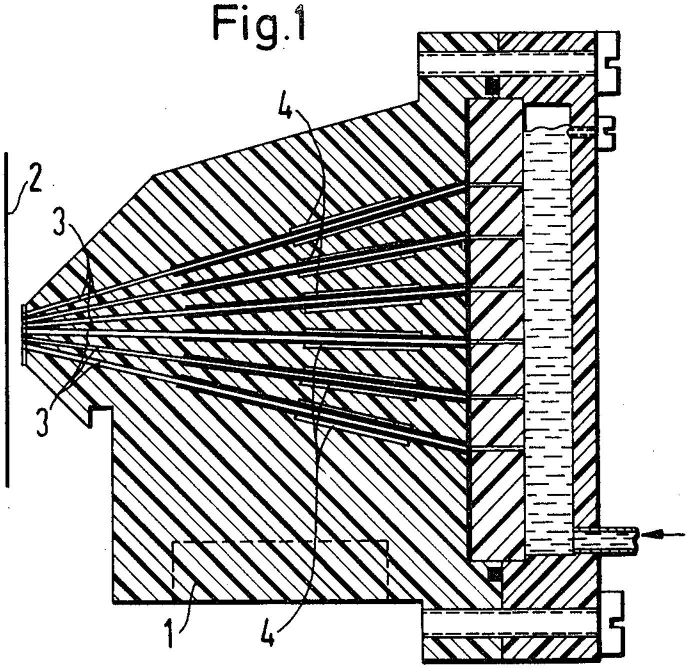
FIG. 1 is a sectional side view through a printer head for an ink-operated mosaic printer unit in accordance with the principles of the invention.

A piezoelectrically operated printer head 1 as best seen at FIG. 1 is moved, by means of an arrangement not illustrated here, in line fashion along a data carrier 2 and at the same time pulse driven character fashion by a character generator which has not been illustrated here. The printer head 1 consists of a single product cast in a dielectric synthetic material, which contains several passages 3 holding the printing liquid. Each ink passage is cylindrically surrounded by a piezoelectric drive element 4 which when driven via the character generator, contracts and in so doing ejects droplets of the printing liquid contained in the ink passages 3.

Figure 2:
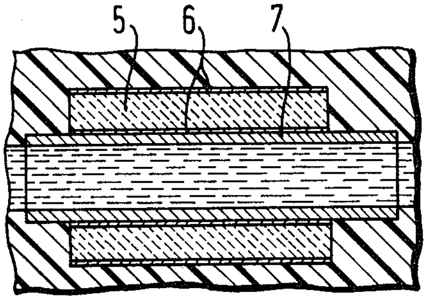
FIG. 2 is a sectional view through a drive element depicting an inserted protective tube of metal in accordance with the principles of the invention.

As best seen at FIG. 2, the drive element 4 itself consists of a cylindrical ceramic body 5 provided on inside and outside with electrodes 6 which consist of a thin stoved silver finish applied to the ceramic body 5. The drive element 4 is provided internally with an electrically conductive protective layer impermeable to ink such as a metal protective tube 7. Said protective tube 7 is held in position in the drive element 4 prior to the in situ casting of same, using an electrically conductive adhesive for the purpose. Through this conductive connection between the metal protective tube and the internal electrode of the ceramic body, the drive element can be controlled in a particularly simple and advantageous manner. If, for example, the pulses which cause the contraction of the piezoelectric element are applied to the external electrode of the ceramic tube, whilst the internal electrode is permanently grounded through the conductive link, then between the internal electrode and the ink, no capacitances can develop of the kind which could interfere with the drive function. In each drive element 4, only one connecting lead is needed because all the drive elements 4 are commonly placed at zero potential via the electrically conductive ink.

Figure 3:
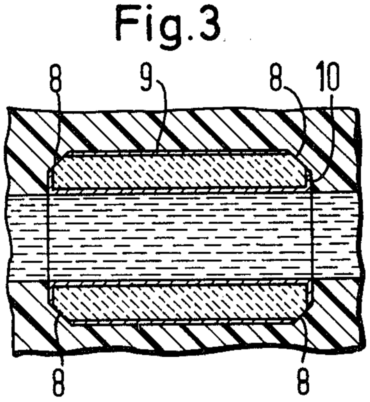
FIG. 3 is a sectional view through a drive element depicting a protective layer applied directly on the ceramic body in accordance with the principles of the invention.

FIG. 3 illustrates a particularly advantageous embodiment of the drive element in accordance with the invention. In this embodiment, the ceramic tube is initially covered completely with the electrically conductive, ink-impermeable protective layer. This protective layer consists of a stoved silver finish mixed with glass solder so that it is consequently rendered electrically conductive and impermeable vis a vis the ink. By subsequently grinding off the edges 8, the protective layer is removed at this location to such an extent that two electrode surfaces 9 and 10 which are electrically insulated from one another, are created. This kind of drive element can then be cast in situ in the printer head directly, without any additional protective tube.

Figure 4:
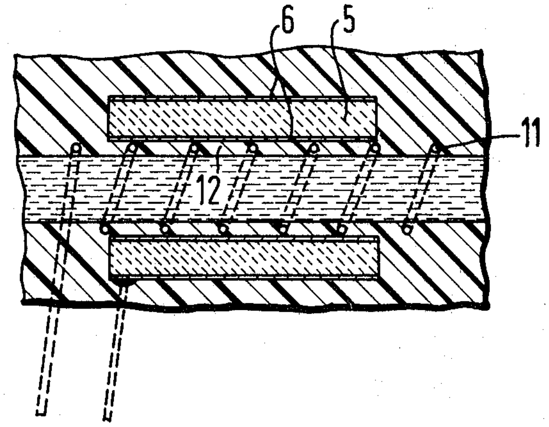
FIG. 4 is a sectional view through a drive element depicting a metal spiral cast in situ in the protective layer in accordance with the principles of the invention.

In FIG. 4, a section through an embodiment of the invention has been shown, in which a metal spiral 11 is cast in situ in the protective layer. To this end, the ceramic tube 5 is placed over a pin in order to cast it in the printer head 1. The uniform adjustment of the drive element and therefore of the gap 12 between ceramic tube 5 and pin, is achieved by means of the metal spiral 11. This copper wire spiral 11 has spring properties and therefore abuts against the internal electrode of the drive element 4 in an elastic fashion. Thus, advantageously, the drive element 4 can be contacted via this spiral 11.

Because the complete ink passage 3 and the printer 1 now consist throughout of smooth cast resin, in putting the printer head 1 into service, the air bubbles which may have formed on the internal wall of the passage 3 can readily be removed therefrom.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the following claims.

We claim as our invention:

1. A piezoelectric drive element for a printer head cast of a dielectric material for use in an ink mosaic printer device, the drive element cylindrically surrounding a passage for ink extending through the printer head and comprising:

- a ceramic body having radially internal and external cylindric faces, the internal face being spaced from the ink in the ink passage;
- a pair of electrodes, one on each of the internal and external cylindric faces of the ceramic body; and
- a metal spiral bearing elastically upon the internal one of the electrodes, the spiral having axially-spaced turns and the cast dielectric material of the printer head filling spaces formed axially between said turns and radially between the ink passage and the internal electrode, whereby said printing ink is ejected droplet fashion upon piezoelectric contraction of the ceramic body.

2. A piezoelectric drive element as defined in claim 1, wherein the metal spiral and the dielectric material are impermeable to printing ink used in the head, the internal electrode and ceramic body thereby being protected from contact with said ink.

* * * * *